United States Patent
Byun et al.

(10) Patent No.: US 8,993,152 B2
(45) Date of Patent: Mar. 31, 2015

(54) RECHARGEABLE BATTERY WITH TERMINAL THROUGH-OUT PORTION, TERMINAL PLATE, AND FASTENING PORTION

(75) Inventors: Sang-Won Byun, Jyunggi-do (KR); Sung-Bae Kim, Jyunggi-do (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 912 days.

(21) Appl. No.: 12/929,288

(22) Filed: Jan. 12, 2011

(65) Prior Publication Data
US 2011/0287290 A1   Nov. 24, 2011

(30) Foreign Application Priority Data
May 20, 2010   (KR) .................. 10-2010-0047712

(51) Int. Cl.
 H01M 2/02  (2006.01)
 H01M 2/30  (2006.01)
 H01M 10/04 (2006.01)
(52) U.S. Cl.
 CPC ............ *H01M 2/30* (2013.01); *H01M 10/0431* (2013.01)
 USPC .................................................. 429/178
(58) Field of Classification Search
 USPC ................................. 429/178–184
 See application file for complete search history.

(56) References Cited

U.S. PATENT DOCUMENTS

| | | | |
|---|---|---|---|
| 7,887,943 B2* | 2/2011 | Yoshikane et al. | 429/123 |
| 2001/0008723 A1* | 7/2001 | Kawakami et al. | 429/49 |
| 2003/0027044 A1* | 2/2003 | Asahina et al. | 429/179 |
| 2005/0153202 A1* | 7/2005 | Ratte et al. | 429/178 |
| 2010/0143786 A1* | 6/2010 | Kim | 429/158 |

FOREIGN PATENT DOCUMENTS

| | | | |
|---|---|---|---|
| JP | 06-231740 A | | 8/1994 |
| JP | 2001-357834 | * | 12/2001 |
| JP | 2001-357834 A | | 12/2001 |

OTHER PUBLICATIONS

Korean Office Action in KR 10-2010-0047712, dated Aug. 26, 2011 (Byun, et al.).

* cited by examiner

*Primary Examiner* — Muhammad Siddiquee
(74) *Attorney, Agent, or Firm* — Lee & Morse, P.C.

(57) ABSTRACT

A rechargeable battery includes an electrode assembly including wound positive and negative electrodes with a separator therebetween, a case configured to contain the electrode assembly, a cap plate configured to seal an opening of the case, the cap plate including a terminal hole therethrough, an electrode terminal through the terminal hole of the cap plate, the electrode terminal including a terminal through-out portion extending through the terminal hole, a terminal plate connected to the terminal through-out portion outside the case, and a fastening portion including a terminal fastening portion connected to the terminal plate, and a lead tab inside the case, the lead tab connecting the terminal through-out portion of the electrode terminal to the electrode assembly.

19 Claims, 7 Drawing Sheets

RECHARGEABLE BATTERY WITH TERMINAL THROUGH-OUT PORTION, TERMINAL PLATE, AND FASTENING PORTION

BACKGROUND

1. Field

The described technology relates generally to a rechargeable battery with an improved fastening force of an electrode terminal.

2. Description of the Related Art

A rechargeable battery may include an electrode assembly formed in a jelly roll shape by winding a positive electrode, a negative electrode, and a separator therebetween, and a case containing the electrode assembly. The rechargeable battery may further include a cap plate sealing an opening of the case, an electrode terminal electrically connected to the electrode assembly and protruding to the outside of the cap plate through a terminal hole formed in the cap plate, and a lead tab respectively connecting the positive electrode and the negative electrode of the electrode assembly to the electrode terminal. For example, the electrode terminal penetrates the terminal hole through an insulation structure. When a plurality of rechargeable battery cells are connected in series or in parallel, the electrode terminal may be fastened by an additional nut via a bus bar connected to the outer side of the cap plate.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery, which substantially overcomes one or more of the problems due to the limitations and disadvantages of the related art.

It is therefore a feature of an embodiment to provide a rechargeable battery with an electrode terminal having strong weldability on an inner side of a cap plate, while having an improved fastening force on an outer side of the cap plate.

At least one of the above and other features and advantages may be realized by providing a rechargeable battery, including an electrode assembly including wound positive and negative electrodes with a separator therebetween, a case configured to contain the electrode assembly, a cap plate configured to seal an opening of the case, the cap plate including a terminal hole therethrough, an electrode terminal through the terminal hole of the cap plate, the electrode terminal including a terminal through-out portion extending through the terminal hole, a terminal plate connected to the terminal through-out portion outside the case, and a fastening portion including a terminal fastening portion connected to the terminal plate, and a lead tab inside the case, the lead tab connecting the terminal through-out portion of the electrode terminal to the electrode assembly.

The terminal through-out portion and the terminal plate may include different materials, and the terminal plate and the terminal fastening portion may include a substantially same material.

The terminal fastening portion and the terminal plate may include a material having a higher mechanical strength than the material of the terminal through-out portion.

The terminal through-out portion may include copper or aluminum, and the terminal plate and the terminal fastening portion include steel.

An interface between the terminal plate and the terminal fastening portion may consist essentially of a material of the terminal plate, and an interface between the terminal through-out portion and the terminal plate may include a material other than materials of the terminal through-out portion and the terminal plate.

The terminal plate may include a through-out portion hole and a protruding portion on at least one side of the through-out portion hole, the terminal through-out portion penetrating through the through-out portion hole.

The protruding portion may include a first protruding portion and a second protruding portion separated from each other along a first direction to be on different sides of the through-out hole portion, the first and second protruding portions extending along a second direction perpendicular to the first direction.

The terminal fastening portion may include a plate portion inserted between the first and second protruding portions, and a screw thread portion integral with and protruding from the plate portion.

The screw thread portion may be a male thread.

The screw thread portion may be a female thread.

The protruding portion may further include a third protruding portion and a fourth protruding portion separated along the second direction to be on different sides of the through-out portion hole, the third and fourth protruding portions extending along the first direction.

The first, second, third, and fourth protruding portions may be connected to each other to define a quadrangular shape. The terminal fastening portion may include a plate portion having a quadrangular shape corresponding to that of the protruding portion and a screw thread portion integrally extending from the plate portion, the plate portion being inserted into the quadrangularly-shaped protruding portion.

The rechargeable battery may further include fifth and sixth protruding portions, the first through sixth protruding portions being connected with each other to define a hexagonal shape. The terminal fastening portion may include a plate portion having a hexagonal shape corresponding to that of the protruding portion and a screw thread portion integrally extending from the plate portion, the plate portion being inserted into the hexagonally-shaped protruding portion.

At least one of the above and other features and advantages may also be realized by providing a method of forming a rechargeable battery, including forming an electrode assembly including wound positive and negative electrodes with a separator therebetween, forming a case configured to contain the electrode assembly, forming a cap plate configured to seal an opening of the case, the cap plate including a terminal hole therethrough, forming an electrode terminal through the terminal hole of the cap plate, the electrode terminal including a terminal through-out portion extending through the terminal hole, a terminal plate connected to the terminal through-out portion outside the case, and a fastening portion including a terminal fastening portion connected to the terminal plate, and forming a lead tab connecting the terminal through-out portion of the electrode terminal to the electrode assembly inside the case.

The terminal through-out portion and the terminal plate may be connected to each other by caulking, and the terminal plate and the terminal fastening portion may be connected to each other by welding.

The terminal through-out portion and the terminal plate may be formed of different materials, and the terminal plate and the terminal fastening portion may be formed of a substantially same material.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
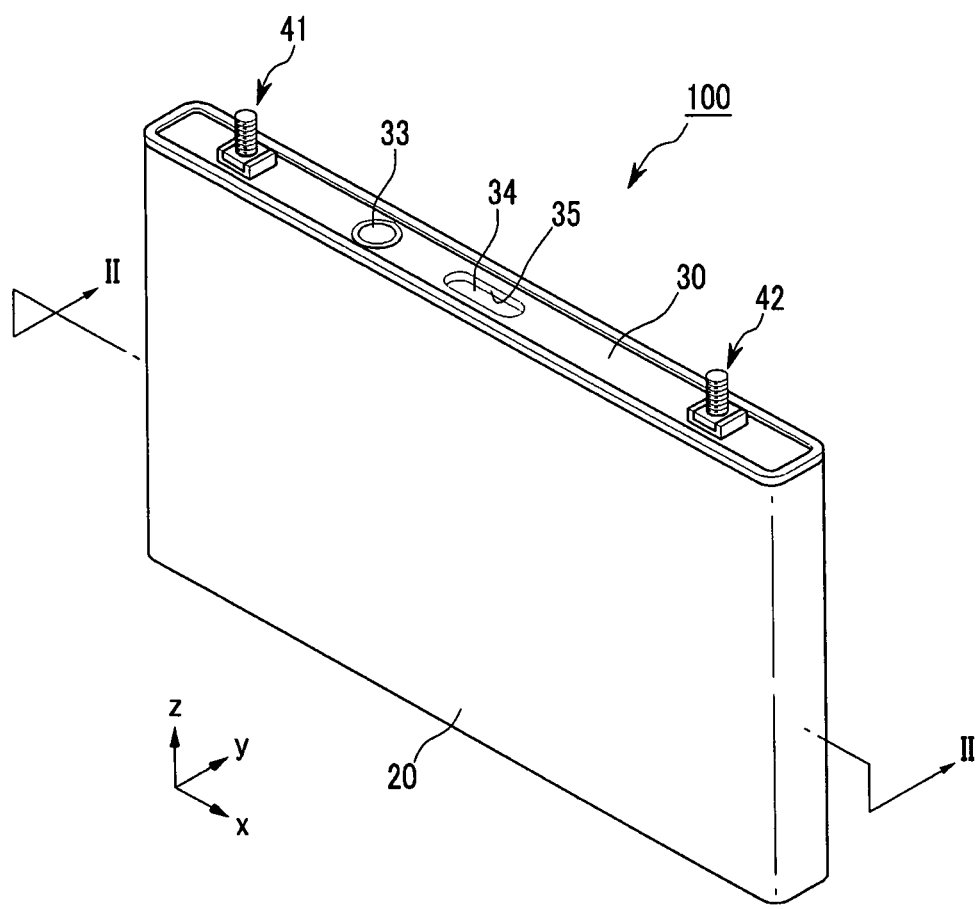
FIG. 1 illustrates a perspective view of a rechargeable battery according to a first exemplary embodiment.

Korean Patent Application No. 10-2010-0047712, filed on May 20, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
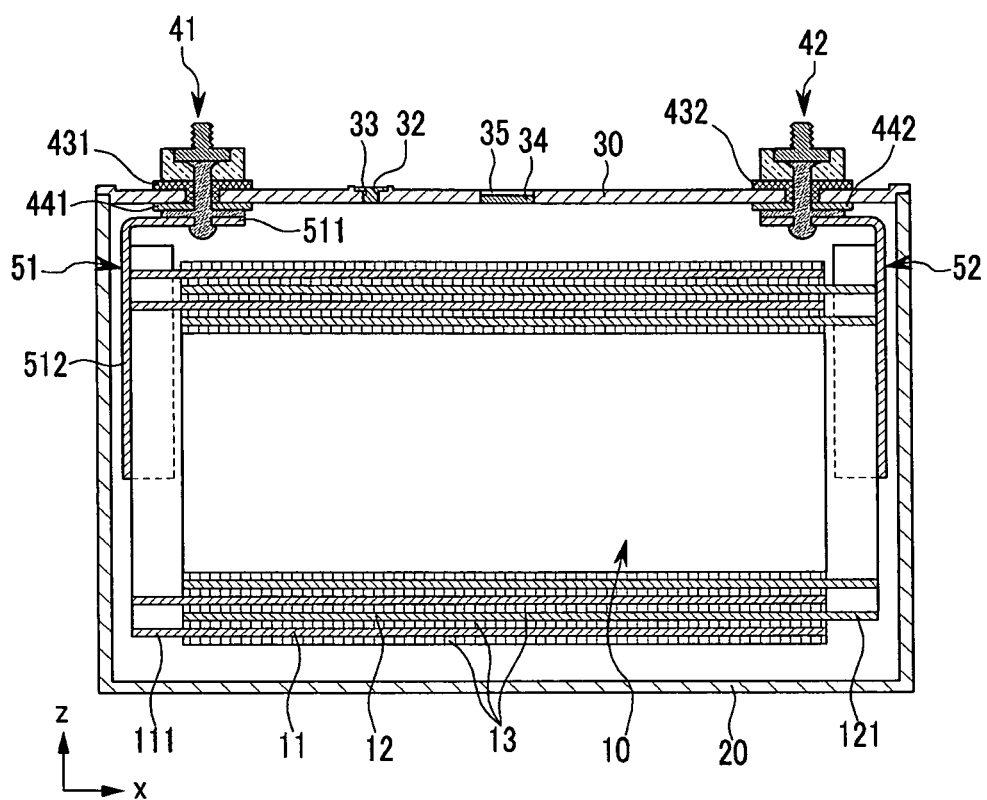
FIG. 2 illustrates a cross-sectional view of FIG. 1, taken along the line II-II.

FIG. 1 illustrates a perspective view of a rechargeable battery according to a first exemplary embodiment, and FIG. 2 illustrates a cross-sectional view of FIG. 1 along line II-II. Referring to FIG. 1 and FIG. 2, a rechargeable battery 100 of the first exemplary embodiment may include a case 20 for containing an electrode assembly 10, a cap plate 30 sealing an opening formed at one side of the case 20, electrode terminals 41 and 42 through the cap plate 30, and lead tabs 51 and 52 connecting respective electrode terminals 41 and 42 with the electrode assembly 10, e.g., by welding.

The electrode assembly 10 may include an insulating separator 13, a positive electrode 11, and a negative electrode 12. The positive electrode 11 and the negative electrode 12 may be disposed at both sides of the separator 13, and the electrode assembly 10 may be formed in a jelly roll shape by winding the positive and negative electrodes 11 and 12 together with the separator 13. The positive electrode 11 and the negative electrode 12 respectively include a current collector formed as a thin plate metal foil and an active material coated on the surface of the current collector. In addition, the positive electrode 11 and the negative electrode 12 may be respectively partitioned to a coated region, i.e., where the active material is coated on the current collector, and uncoated regions 111 and 121, i.e., where the current collector is not coated by the active material. The coated region forms the most of the positive and electrodes 11 and 12 in the electrode assembly 10, and the uncoated regions 111 and 121 are respectively disposed at both sides of the coated region in the jelly roll state.

The uncoated regions 111 and 121 of the respective positive and negative electrodes 11 and 12 may be connected to respective lead tabs 51 and 52, and may have substantially same structures. Thus, the uncoated region 111 and the lead tab 51 formed at the positive electrode 11 side will be exemplarily described. The lead tab 51 may include a connection portion 511 connected to the electrode terminal 41 and a current collecting region 512 extending from the connection portion 511 toward a bottom of the case 20. The collecting region 512 may be bent relatively to the connection portion 511, e.g., may be perpendicular thereto, and may be connected to the uncoated region 111, e.g., by ultrasonic welding or laser welding. The connection portion 511 may include a fastening hole 513 (FIG. 3) opened toward the electrode terminal 41 for connection with the electrode terminal 41.

The case 20 may outline the rechargeable battery 100, and may be formed of a conductive metal, e.g., aluminum, aluminum alloy, or nickel-plated steel. The case 20 provides a space for installing the electrode assembly 10. For example, the case 20 may have a hexahedron shape having an opening at one side for receiving a hexahedral-shaped electrode assembly 10. The opening of the case 20 faces upward in FIGS. 1 and 2.

The cap plate 30 may be formed as a thin plate, and may be coupled to the opening of the case 20 to seal the opening. While blocking the inside of the sealed case 20 from the outside, the cap plate 30 may connect the inside and the outside of the case 20 as necessary. For example, the cap plate 30 may include an electrolyte solution inlet 32 for insertion of an electrolyte solution into the sealed case 20. After insertion of the electrolyte solution, the electrolyte solution inlet 32 may be sealed by a sealing cap 33.

The cap plate 30 may further include a vent hole 35 and a vent plate 34, e.g., formed of a plate thinner than the cap plate 30, welded to the vent hole 35. When the internal pressure of the case 20 is increased over a predetermined level, the vent plate 34 is ruptured by gas generated through charging and discharging of the electrode assembly 10 to prevent explosion of the rechargeable battery 100.

The electrode terminals 41 and 42 may be respectively provided in terminal holes 311 and 312 (FIG. 4) through the cap plate 30 to draw out the positive and negative electrodes 11 and 12 of the electrode assembly 10. For example, the electrode terminals 41 and 42 may extend through respective terminal holes 311 and 312, while outer insulators 431 and 432, as well as inner insulators 441 and 442, may electrically insulate between each of the electrode terminals 41 and 42 and the cap plate 30. The terminal holes 311 and 312, the inner insulators 441 and 442, and the outer insulators 431 and 432 may be formed in the two electrode terminals 41 and 42 with the same structure. Therefore, the electrode terminal 41, the terminal hole 311, the inner insulator 441, and the outer insulator 431 at one side will be exemplarily described.

As illustrated in FIG. 2, the outer insulator 431 may be partially inserted into the terminal hole 311 from the outside of the cap plate 30 to electrically insulate the electrode terminal 41 and the cap plate 30. That is, the outer insulator 431 insulates the outer surface of the electrode terminal 41 and the outer surface of the cap plate 30, and simultaneously insulates the outer surface of the electrode terminal 41 and an inner surface of the terminal hole 311. The inner insulator 441 electrically insulates the cap plate 30 and the lead tab 51 in the inside of the cap plate 30 corresponding to the terminal hole 311. That is, the inner insulator 441 insulates the upper surface of the connection portion 511 of the lead tab 51 and the inner surface of the cap plate 30.

Figure 3:
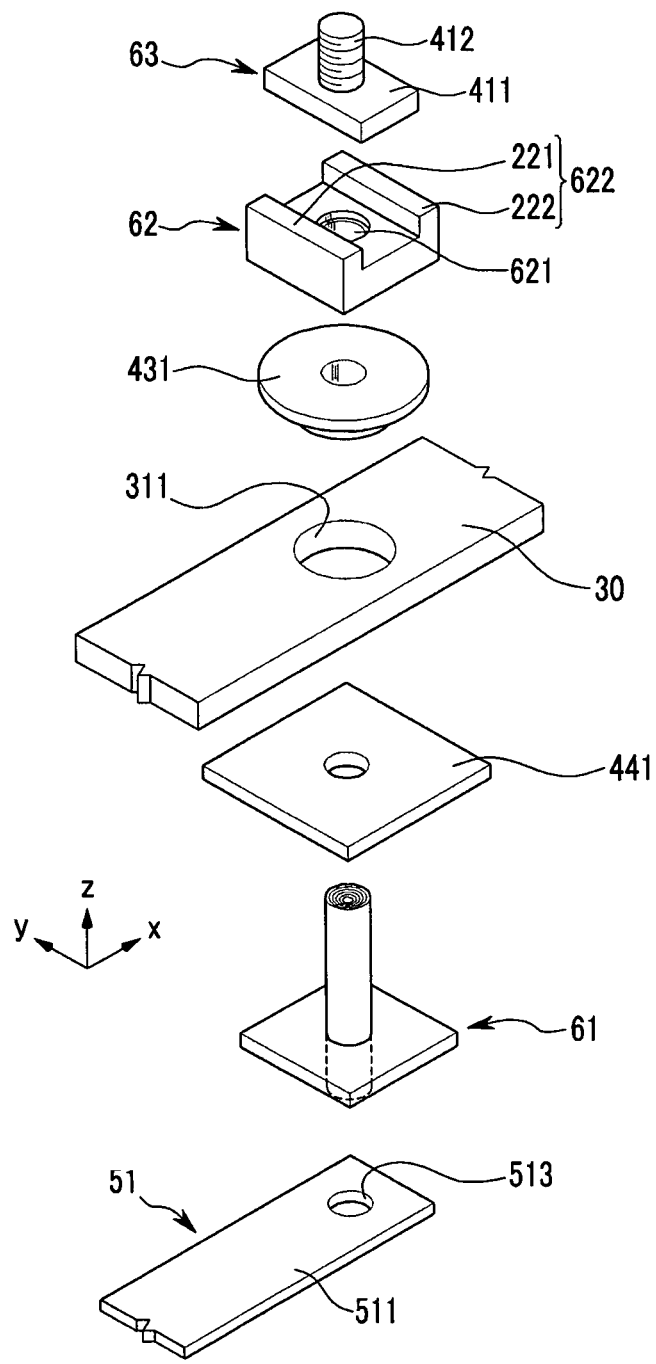
FIG. 3 illustrates an exploded perspective view of an electrode terminal.
Figure 4:
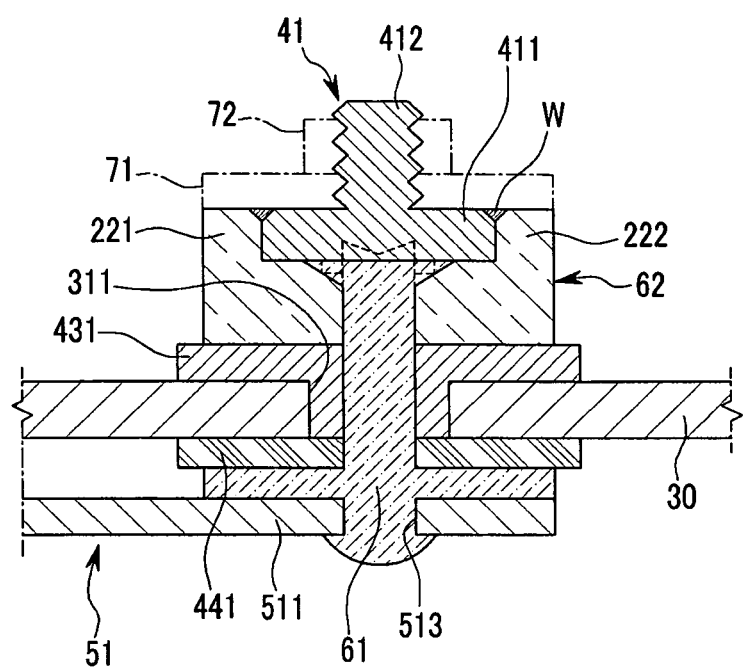
FIG. 4 illustrates a cross-sectional view of an electrode terminal and a bus bar in a fastened state.

FIG. 3 illustrates a detailed, exploded perspective view of the electrode terminal 41. FIG. 4 illustrates a cross-sectional view of the electrode terminal 41 and a bus bar in a fastened state.

Referring to FIG. 3 and FIG. 4, the electrode terminal 41 according to example embodiments may be formed to maintain excellent weldability with the lead tab 51 at the inner side of the cap plate 30, i.e., in the interior of the case 20, and to have a strong fastening force at the outer side of the cap plate 30, i.e., in the exterior of the case 20. Therefore, the electrode terminal 41 may include a terminal through-out portion 61, a terminal plate 62, and a terminal fastening portion 63 that are separately fastened and connected, as will be explained in detail below. That is, the separately formed terminal through-out portion 61, terminal plate 62, and terminal fastening portion 63 may form the electrode terminal 41 by being fastened and connected to each other. Thus, the materials and connection methods of the terminal through-out portion 61, the terminal plate 62, and the terminal fastening portion 63 of the electrode terminal 41 may be selectively adjusted to provide strong connections both inside and outside the case 20.

In other words, in the electrode terminal 41, the terminal through-out portion 61 may be connected to the lead tab 51 inside the case 20 in order to maintain excellent weldability with the connection portion 511 of the lead tab 51 at the inner side of the cap plate 30. Further, the terminal fastening portion 63 may be formed outside the case 20 in order to increase torque durability when being fastened with a nut 72 of a bus bar 71 at the outer side of the cap plate 30, thereby providing a strong fastening force. In this case, the terminal plate 62 may be fastened to the terminal through-out portion 61 and may be connected to the terminal fastening portion 63. That is, the terminal plate 62 may connect the terminal through-out portion 61 and the terminal fastening portion 63, thereby enabling the electrode terminal 41 to exhibit both excellent weldability and strong fastening force.

In detail, the terminal through-out portion 61 and the terminal plate 62 may be formed of different materials, and therefore, may be fastened to each other via caulking. As such, a fastening force, e.g., via caulking, between the terminal through-out portion 61 and the terminal plate 62 may be increased despite the different materials, thereby preventing deterioration of weldability between the terminal through-out portion 61 and the connection portion 511 of the lead tab 51. The terminal plate 62 and the terminal fastening portion 63 may be formed of the same material, and therefore, may be welded to each other. As such, a fastening force between the terminal fastening portion 63 and the nut 72 may be reinforced. In other words, the terminal plate 62 and the terminal fastening portion 63 may be coupled by welding so that they have strong weldability. As the different parts of the electrode terminal 41 are formed of different materials and are connected to each other by different methods, an interface between the terminal plate 62 and the terminal fastening portion 63 may consist essentially of a material of the terminal plate, i.e., due to the welding, and an interface between the terminal through-out portion 61 and the terminal plate 62 may include a material other than materials of the terminal through-out portion 61 and the terminal plate 62, i.e., due to the caulking.

The terminal fastening portion 63 and the terminal plate 62 may be formed of a mechanically stronger material, i.e., a material capable of withstanding a higher stress application, than the terminal through-out portion 61. For example, the terminal through-out portion 61 may be made of copper or aluminum, and the terminal plate 62 and terminal fastening portion 63 may be made of steel. Thus, when the nut 72 is mounted on the terminal fastening portion 63 with the bus bar 71, the terminal fastening portion 63 may endure strong torque and the terminal plate 62 and the terminal fastening portion 63 may maintain the strong welding state against the strong torque.

The terminal through-out portion 61 may include a substantially flat member extending between the connection portion 511 of the lead tab 51 and the cap plate 30, e.g., the inner insulator 441 may separate the flat member of the terminal through-out portion 61 from the cap plate 30. A vertical protruding portion may extend from the flat member of the terminal through-out portion 61 through the terminal hole 311 to be inserted into the terminal plate 62, e.g., the outer insulator 431 may separate the vertical protruding portion from the cap plate 30. The flat member and the vertical protruding portion of the terminal through-out portion 61 may be integral, and may further include a terminal portion below the connection portion 511 of the lead tab 51 to increase stability between the lead tab 51 and the terminal through-out portion 61.

The terminal plate 62 may include a through-out hole 621 and at least one protruding portion 622 at one side of the through-out hole 621. The through-out hole 621 may be aligned with the terminal through-out portion 61, i.e., with the vertical protruding portion of the terminal through-out portion 61, so the terminal through-out portion 61 may penetrate the through-out hole 621. For example, the through-out hole 621 may have a step at the plane center of the terminal plate 62, e.g., so the terminal through-out portion 61 may be inserted therein. For example, an upper surface of the protruding portion 622 may extend above the through-out hole 621, and the through-out hole 621 and the terminal through-out portion 61 may be deformed from the dash-dot line state to the solid line state and then fastened to each other by caulking.

For example, the protruding portion 622 of the terminal plate 62 may be formed at one side of the through-out hole 621. In another example, as shown in FIG. 3 and FIG. 4, the protruding portion 622 may include a first protruding portion 221 and a second protruding portion 222 separated from each other along a first direction (x-axis direction) to be at both sides of the through-out hole 621 and to extend along a second direction (y-axis direction) perpendicular to the first direction. When the terminal fastening portion 63 is welded to the terminal plate 62, the protruding portion 622 supports at least one side of the terminal fastening portion 63 to prevent rotation of the terminal fastening portion 63 when the terminal fastening portion 63 receives torque. The first and second protruding portions 221 and 222 may support both sides of the terminal fastening portion 63, so that rotation of the terminal fastening portion 63 can be effectively prevented. In addition, the terminal through-out portion 61 is fastened to the through-out hole 621 at one side and simultaneously caulked and welded to the fastening hole 513 in the connection portion 511 of the lead tab 51, and therefore, the lead tab 51, the terminal plate 62, and the terminal fastening portion 63 may be electrically connected.

The terminal fastening portion 63 may include a plate portion 411 inserted between the first and second protruding portions 221 and 222 of the terminal plate 62, e.g., to cover the through-out hole 621. The plate portion 411 may be welded to the terminal plate 62, and a screw thread portion 412, e.g., integrally formed with the plate 411, may extend vertically from the plate portion 411 away from the terminal plate 62. For example, when the plate portion 411 is inserted between the first and second protruding portions 221 and 222 of the terminal plate 62, the plate portion 411 may completely fill a space between the first and second protruding portions 221 and 222, and upper surfaces of the plate portion 411 and the first and second protruding portions 221 and 222 may be substantially coplanar. Therefore, rotation of the plate portion 411 may be prevented by the first and second protruding portions 221 and 222, as well as by welding portions W of the first and second protruding portions 221 and 222. As such, torque durability of the plate portion 411 with respect to torque transmitted to the screw thread portion 412 may be increased. In other words, the torque transmitted to the screw thread portion 412 is blocked by the first and second protruding portions 221 and 222 through the plate portion 411 and the welding portions W of the first and second protruding portions 221 and 222. For example, as illustrated in FIG. 4, the welding portions W may be at an interface, e.g., at upper surfaces facing away from the cap plate 30, between the plate portion 411 of the terminal fastening portion 63 and the first and second protruding portions 221 and 222 of the terminal plate 62.

As illustrated in FIG. 4, the screw thread portion 412 may be inserted to a fastening hole of the bus bar 71 to be fastened with the nut 72 on the bus bar 71. In this case, the bus bar 71 connects rechargeable batteries 100 arranged adjacent to each other in series or in parallel.

Figure 5:
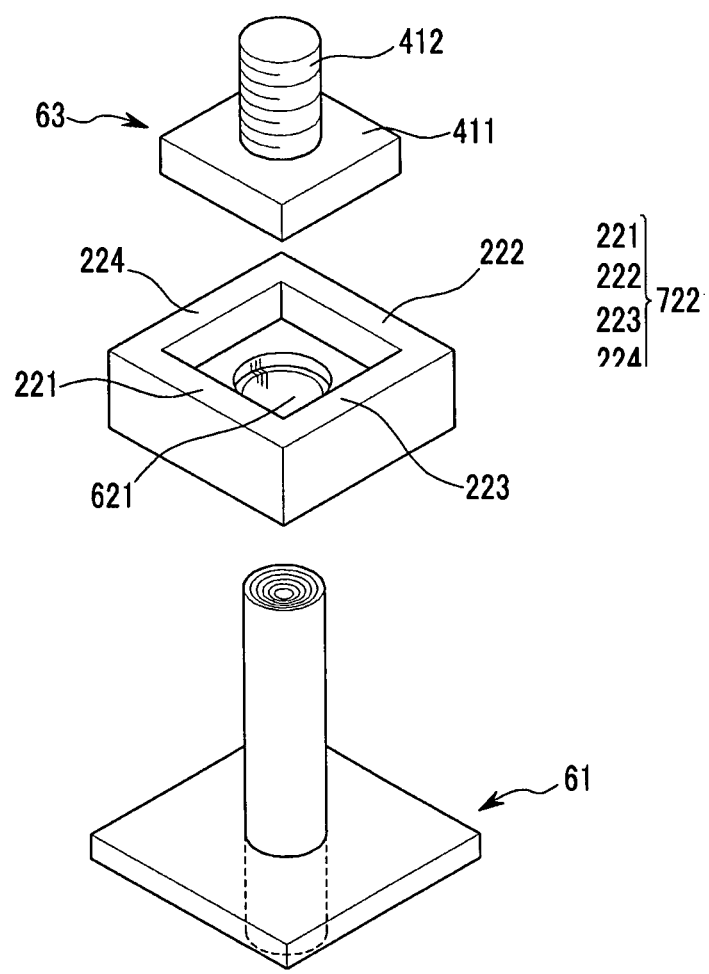
FIG. 5 illustrates an exploded perspective view of an electrode terminal of a rechargeable battery according to a second exemplary embodiment.

FIG. 5 illustrates an exploded perspective view of an electrode terminal of a rechargeable battery according to a second exemplary embodiment. Referring to FIG. 5, in an electrode terminal 81 of the second exemplary embodiment, a protruding portion 722 of a terminal plate may include the first and second protruding portions 221 and 222 of the first exemplary embodiment, and a third protruding portion 223 and a fourth protruding portion 224 separated from each other along the second direction, i.e., along the y-axis, to be on both sides of the through-out hole 621 and to extend along the first direction, i.e., along the x-axis.

The protruding portion 722, i.e., the first, second, third, and fourth protruding portions 221, 222, 223 and 224, may be formed independently, and the first through fourth protruding portions 221 through 224 may be connected with each other to form a quadrangle shape extending above and surrounding the through-out hole 621. The plate portion 411 in the terminal fastening portion 63 may be formed in a quadrangular shape corresponding to the shape of the protruding portion 722, so the plate portion 411 may be inserted into the protruding portion 722 and welded thereto. In this case, torque transmitted to the screw thread portion 412 is blocked by the first, second, third, and fourth protruding portions 221, 222, 223, and 224, and is blocked by the plate portion 411 and welding portions of the first, second, third, and fourth protruding portions 221, 222, 223, and 224. The larger number of the protruding portions in the protruding portion 722 of the second exemplary embodiment may provide a stronger fastening force of the terminal fastening portion 63 than that of the first exemplary embodiment.

Figure 6:
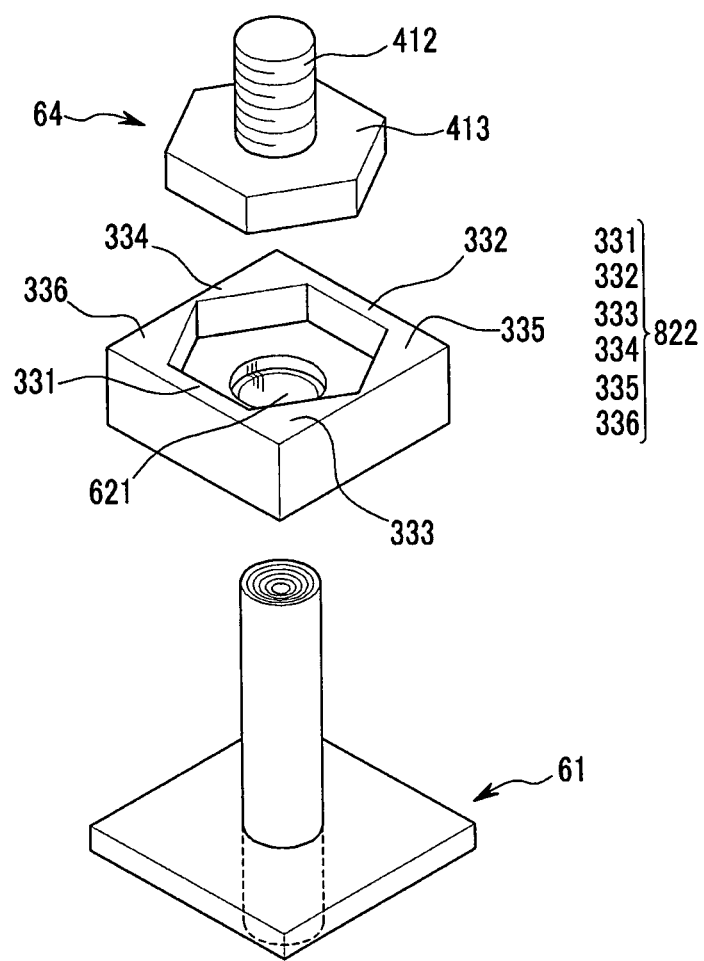
FIG. 6 illustrates an exploded perspective view of an electrode terminal of a rechargeable battery according to a third exemplary embodiment.

FIG. 6 illustrates an exploded perspective view of an electrode terminal of a rechargeable battery according to a third exemplary embodiment. Referring to FIG. 6, in an electrode terminal 82 of the third exemplary embodiment, first, second, third, fourth, fifth, and sixth protruding portions 331, 332, 333, 334, 335, and 336 of a protruding portion 822 may be connected with each other to form a hexagonal space surrounding a through-out portion hole 621. A plate portion 413 in a terminal fastening portion 64 may be formed to have a hexagonal shape inserted into the hexagonal shape of the protruding portion 822 and welded thereto. In this case, a torque transmitted to the screw thread portion 412 is blocked by the first through sixth protruding portions 331 through 336 via the plate portion 413 and the welding portions of the protruding portion 822. The protruding portion 822 of the third exemplary embodiment may have a similar fastening force, as compared to the protruding portion 722 of the second exemplary embodiment, and may be modified to various structures. Thus, the protruding portion 822 and the plate portion 413 may have any suitable polygonal shape, e.g., quadrangular, hexagonal, etc.

Figure 7:
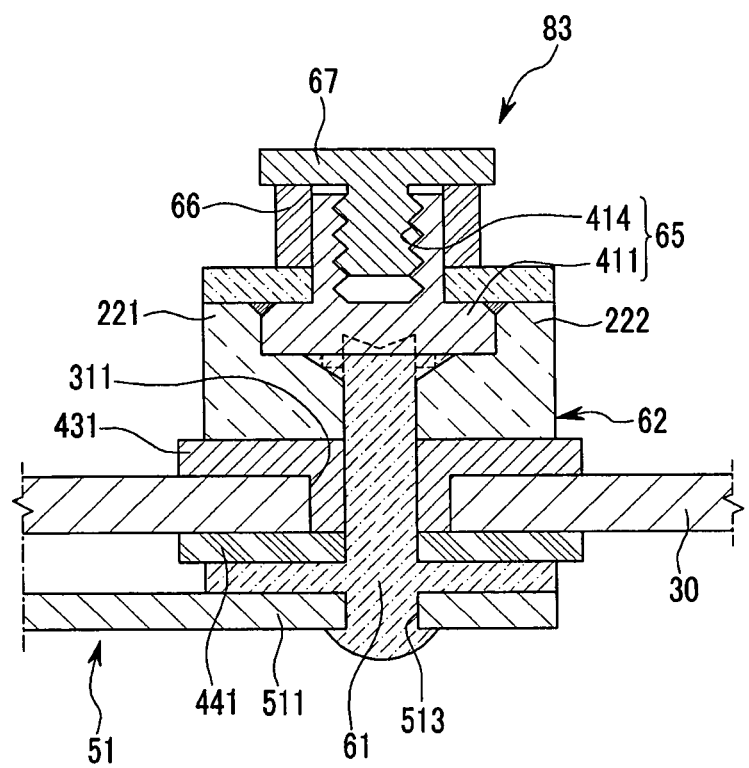
FIG. 7 illustrates a cross-sectional view of an electrode terminal and a bus bar of a rechargeable battery in a fastened state according to a fourth exemplary embodiment.

FIG. 7 illustrates a cross-sectional view of an electrode terminal and a bus bar of a rechargeable battery 200 in a fastened state according to a fourth exemplary embodiment. As illustrated in FIG. 7, a screw thread portion 414 of a terminal fastening portion 65 formed in an electrode terminal 83 may be formed as a female thread. Compared to the first to third exemplary embodiments, a spacer 66 and a bolt 67 that supports the spacer 66 by being screw thread-coupled to the screw thread portion 414 may be used to fasten terminal fastening portions 65 of cells of neighboring rechargeable batteries 200 with the bus bar 71 instead of using the nut 72. The bolt 67 may be fastened to the screw thread portion 414, and therefore, the bus bar 71 may press the first and second protruding portions 221 and 222 of the terminal plate 62 through the spacer 66.

As described above, according to the exemplary embodiments, the electrode terminal may include the terminal through-out portion, the terminal plate, and the terminal fastening portion, which may be separately formed and then fastened and connected to each other. As such, each part of the electrode terminal may be formed of a different material. Thus, strong weldability between the terminal through-out portion and the lead tab may be maintained at the inner side of the cap plate, and simultaneously, an improved fastening force between the terminal fastening portion and the terminal plate at the outer side of the cap plate may be provided. That is, when a nut is fastened to a bus bar in the terminal fastening portion, a fastening torque of the nut may be reinforced, and when the bus bar is coupled to the terminal fastening portion by welding, weldability between the terminal fastening portion and the bus bar may be enhanced.

In contrast, when a conventional electrode terminal is formed of a single material, it may be difficult to have both a strong fastening force with the nut or bus bar while maintaining weldability with the lead tab. For example, when the conventional electrode terminal is made of copper or aluminum, it may exhibit excellent weldability with a copper or aluminum lead tab, but it may not have a strong fastening force with a steel nut or bus bar outside the cap plate. In such a case, the nut may be loosened or the welding portion of the electrode terminal and the bus bar may be separated due to vibration, temperature, or impact, thereby increasing contact resistance.

Exemplary embodiments have been disclosed herein, and although specific terms are employed, they are used and are to be interpreted in a generic and descriptive sense only and not

| <Description of symbols> | |
|---|---|
| 10: electrode assembly | 11: positive electrode |
| 12: negative electrode | 13: separator |
| 20: case | 30: cap plate |
| 32: electrolyte solution inlet | 33: sealing cap |
| 34: vent plate | 35: vent hole |
| 41, 42, 81, 82, 83: electrode terminal | 51, 52: lead tab |
| 61: terminal through-out | 62: terminal plate |
| 63, 64, 65: terminal fastening portion | 66: spacer |
| 67: bolt | 71: bus bar |
| 72: nut | 100, 200: rechargeable battery |
| 111, 121: uncoated region | |
| 221, 222, 223, 224: first through fourth protruding portions | |
| 311, 312: terminal hole | |
| 331, 332, 333, 334, 335, 336: first through sixth protruding portions | |
| 411, 413: plate portion | 412, 414: screw thread portion |
| 431, 432: outer insulator | 441, 442: inner insulator |
| 511: connection portion | 512: current collecting portion |
| 513: fastening hole | 621: through-out hole |
| 622, 722, 822: protruding portion | |

What is claimed is:

1. A rechargeable battery, comprising:
an electrode assembly including wound positive and negative electrodes with a separator therebetween;
a case configured to contain the electrode assembly;
a cap plate configured to seal an opening of the case, the cap plate including a terminal hole therethrough;
an electrode terminal through the terminal hole of the cap plate, the electrode terminal including:
a terminal through-out portion extending outwardly through the terminal hole and away from the electrode assembly,
a terminal plate physically connected to the terminal through-out portion outside the case, the terminal plate including a through-out portion hole and a protruding portion on at least one side of the through-out portion hole, the terminal through-out portion penetrating through the through-out portion hole, and
a fastening portion including a terminal fastening portion physically connected to the terminal plate; and
a lead tab inside the case, the lead tab physically connecting the terminal through-out portion of the electrode terminal to the electrode assembly,
wherein the terminal through-out portion and the terminal plate include different materials, and the terminal plate and the terminal fastening portion include a substantially same material,
the substantially same material included by the terminal fastening portion and the terminal plate has a higher mechanical strength than the material of the terminal through-out portion,
the terminal through-out portion includes an integral flat plate inside the case and parallel to the lead tab, an insulator separating the flat plate from the cap plate being positioned on the flat plate; and
the terminal through-out portion, the terminal plate, and the fastening portion are non-integral with each other.

2. The rechargeable battery as claimed in claim 1, wherein the terminal through-out portion includes copper or aluminum, and the terminal plate and the terminal fastening portion include steel.

3. A rechargeable battery, comprising:
an electrode assembly including wound positive and negative electrodes with a separator therebetween;
a case configured to contain the electrode assembly;
a cap plate configured to seal an opening of the case, the cap plate including a terminal hole therethrough;
an electrode terminal through the terminal hole of the cap plate, the electrode terminal including:
a terminal through-out portion extending outwardly through the terminal hole and away from the electrode assembly,
a terminal plate physically connected to the terminal through-out portion outside the case, and
a fastening portion including a terminal fastening portion physically connected to the terminal plate; and
a lead tab inside the case, the lead tab physically connecting the terminal through-out portion of the electrode terminal to the electrode assembly,
wherein an interface between the terminal plate and the terminal fastening portion consists essentially of a material of the terminal plate, and an interface between the terminal through-out portion and the terminal plate includes a material other than materials of the terminal through-out portion and the terminal plate,
the terminal through-out portion includes an integral flat plate inside the case and parallel to the lead tab, an insulator separating the flat plate from the cap plate being positioned on the flat plate; and
the terminal through-out portion, the terminal plate, and the fastening portion are non-integral with each other.

4. The rechargeable battery as claimed in claim 1, wherein the protruding portion includes a first protruding portion and a second protruding portion separated from each other along a first direction to be on different sides of the through-out hole portion, the first and second protruding portions extending along a second direction perpendicular to the first direction.

5. The rechargeable battery as claimed in claim 4, wherein the terminal fastening portion includes a plate portion inserted between the first and second protruding portions, and a screw thread portion integral with and protruding from the plate portion.

6. The rechargeable battery as claimed in claim 5, wherein the screw thread portion is a male thread.

7. The rechargeable battery as claimed in claim 5, wherein the screw thread portion is a female thread.

8. The rechargeable battery as claimed in claim 4, wherein the protruding portion further comprises a third protruding portion and a fourth protruding portion separated along the second direction to be on different sides of the through-out portion hole, the third and fourth protruding portions extending along the first direction.

9. The rechargeable battery as claimed in claim 8, wherein the first, second, third, and fourth protruding portions of the protruding portion are physically connected to each other to define a quadrangularly-shaped protruding portion.

10. The rechargeable battery as claimed in claim 9, wherein the terminal fastening portion includes a plate portion having a quadrangular shape corresponding to that of the quadrangularly-shaped protruding portion and a screw thread portion integrally extending from the plate portion, the plate portion being inserted into the quadrangularly-shaped protruding portion.

11. The rechargeable battery as claimed in claim 8, further comprising fifth and sixth protruding portions, the first through sixth protruding portions being physically connected with each other to define a hexagonally-shaped protruding portion.

12. The rechargeable battery as claimed in claim 11, wherein the terminal fastening portion includes a plate portion having a hexagonal shape corresponding to that of the hexagonally-shaped protruding portion and a screw thread portion integrally extending from the plate portion, the plate portion being inserted into the hexagonally-shaped protruding portion.

13. A method of forming a rechargeable battery, comprising:
 forming an electrode assembly including wound positive and negative electrodes with a separator therebetween;
 forming a case configured to contain the electrode assembly;
 forming a cap plate configured to seal an opening of the case, the cap plate including a terminal hole therethrough;
 forming an electrode terminal through the terminal hole of the cap plate, the electrode terminal including:
  a terminal through-out portion extending outwardly through the terminal hole and away from the electrode assembly,
  a terminal plate physically connected to the terminal through-out portion outside the case, and
  a fastening portion including a terminal fastening portion physically connected to the terminal plate; and
 forming a lead tab physically connecting the terminal through-out portion of the electrode terminal to the electrode assembly inside the case,
 wherein the terminal through-out portion and the terminal plate are physically connected to each other by caulking, and the terminal plate and the terminal fastening portion are physically connected to each other by welding,
 the terminal through-out portion and the terminal plate include different materials, and the terminal plate and the terminal fastening portion include a substantially same material,
 the substantially same material included by the terminal fastening portion and the terminal plate has a higher mechanical strength than the material of the terminal through-out portion,
 the terminal through-out portion includes an integral flat plate inside the case and parallel to the lead tab, an insulator separating the flat plate from the cap plate being positioned on the flat plate; and
 the terminal through-out portion, the terminal plate, and the fastening portion are non-integral with each other.

14. The rechargeable battery as claimed in claim 1, wherein:
 the entire fastening portion is above the through-out portion hole of the terminal plate, the through-out portion hole being between the fastening portion and the terminal through-out portion; and
 the terminal fastening portion completely covers and overlaps the through-out portion hole.

15. The rechargeable battery as claimed in claim 14, wherein the terminal through-out portion extends through the through-out portion hole of the terminal plate to contact the fastening portion.

16. The rechargeable battery as claimed in claim 3, wherein the electrode terminal includes connection seams at least between the terminal through-out portion and the terminal plate.

17. The rechargeable battery as claimed in claim 14, wherein the terminal through-out portion includes a vertically protruding portion physically connected to the flat plate and extending outwardly through the terminal hole.

18. The rechargeable battery as claimed in claim 3, wherein the terminal through-out portion includes a vertically protruding portion physically connected to the flat plate and extending outwardly through the terminal hole.

19. The rechargeable battery as claimed in claim 3, wherein the material of the terminal plate has a higher mechanical strength than the material of the terminal through-out portion.

* * * * *